3,058,986
N-AMINOALKYL-4-PHENYL-4-LOWER ALKYL-2-PYRROLIDONES

August Hans Lutz and Otto Schnider, Basel, Switzerland, assignors to Hoffmann-La Roche Inc., Nutley, N.J., a corporation of New Jersey
No Drawing. Filed Jan. 4, 1960, Ser. No. 4
Claims priority, application Switzerland Jan. 30, 1959
5 Claims. (Cl. 260—294)

This invention relates to substituted pyrrolidones. The invention encompasses the bases as well as salts of such bases.

More particularly, the invention relates to substituted pyrrolidones represented by the formula (I)
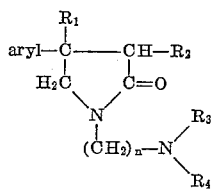

wherein n represents a whole number from 1 to 6, $R_1$ and $R_2$ each represents hydrogen or alkyl and $R_3$ and $R_4$ each represents hydrogen or alkyl or $R_3$ and $R_4$ together with the nitrogen form a 5 or 6-membered saturated nitrogen monoheterocyclic, and acid addition salts of such pyrrolidones.

In the above formula, the symbols R represent saturated straight chain or branched chain aliphatic groups, preferably lower alkyl groups, such as methyl, ethyl, propyl, isopropyl, butyl, isobutyl, t-butyl, amyl and the like. When $R_3$ and $R_4$ are joined, i.e. the group

forms a heterocyclic ring, this tertiary nitrogen group represents such saturated 5 or 6-membered saturated heterocyclic groups as piperidyl, morpholinyl, pyrrolidyl, etc. Aryl groups found in the 4-position of the pyrrolidone ring are preferably phenyl radicals or monosubstituted phenyl radicals.

The compounds of Formula I may be produced, for example, by converting a 4-aryl-2-pyrrolidone, containing the appropriate substituents in the 3 and 4-positions corresponding to $R_1$ and $R_2$, to its alkali metal salt, e.g. with sodium methylate, in an inert solvent, preferably diethylcarbonate, and then reacting the salt with an aminoalkyl halogenide wherein the basic group comprises a mono or dialkyl substituted amino group or a 5 or 6-membered heterocyclic ring.

According to an alternate method, the alkali metal salt of the 4-aryl-2-pyrrolidone may be reacted with an α,ω-alkylenedihalogenide and the 1-haloalkyl-4-aryl-2-pyrrolidone thus obtained converted with a substituted or unsubstituted amine.

As a further alternative, the starting material may be reacted with amines in the presence of formaldehyde or formaldehyde-forming materials.

The basic substituted pyrrolidones formed as described above may be converted to their salts, for example, by treatment with aqueous or alcoholic solutions of organic or inorganic acids. Illustrative salts include mineral acid salts such as the hydrohalides, e.g. hydrochloride, hydrobromide, etc., sulfate, nitrate, and the like, as well as citrate, tartrate, and similar salts of organic acids.

The pyrrolidones of this invention have antirheumatic properties and are useful as analgesics. They may be administered orally or parenterally in conventional dosage forms by incorporating therapeutic dosages of the base or a medicinally acceptable salt, preferably an acid addition salt, in a carrier or vehicle according to standard pharmaceutical practice. The following examples are illustrative of the invention. All temperatures are in degree centigrade.

Example 1

53.5 g. of 4-phenyl-4-isopropyl-2-pyrrolidone were dissolved in 500 ml. of diethylcarbonate and the solution was treated with 14.3 g. of sodium methylate. While stirring, 50 ml. of the methyl alcohol-diethylcarbonate mixture were distilled off. The suspension of the sodium salt of the starting pyrrolidone thus formed was reacted with 41.8 ml. of piperidylpropyl chloride and heated under reflux for 3 hours. After cooling, the reaction product was extracted by shaking with 3 N hydrochloric acid. The acid extract was treated with concentrated ammonia, whereupon 1-piperidylpropyl-4-phenyl-4-isopropyl-2-pyrrolidone settled out as a viscous oil. The 1-piperidylpropyl-4-phenyl-4-isopropyl-2-pyrrolidone was taken up in benzene and distilled, B.P. 193–195°/0.2 mm. Hg.

1-piperidylpropyl - 4 - phenyl-4-isopropyl-2-pyrrolidone hydrochloride, M.P. 160°, was obtained in the form of colorless, slightly water soluble crystals by reacting the base with excess ethanolic HCl.

By following the procedure described in the foregoing paragraphs, the following additional compounds were obtained:

1-piperidylethyl - 4 - phenyl-4-isopropyl-2-pyrrolidone, B.P. 186–190°/0.02 mm. Hg, M.P. 52°; hydrochloride, M.P. 198°.

1 - piperidylethyl-4-phenyl-4-ethyl-2-pyrrolidone, M.P. 78–79°; hydrochloride, M.P. 230°.

1 - dimethylaminopropyl - 4 - phenyl-4-ethyl-2-pyrrolidone, B.P. 153–156°/0.04 mm. Hg; hydrochloride, M.P. 118–119°.

1-piperidylethyl-4-phenyl-4-methyl-2-pyrrolidone, B.P. 69–70°; hydrochloride, M.P. 188°.

1 - piperidylpropyl-4-phenyl - 4 - methyl-2-pyrrolidone, B.P. 195–197°/0.05 mm. Hg; hydrochloride, M.P. 140–141°.

1-dimethylaminopropyl - 4 - phenyl-4-methyl-2-pyrrolidone, B.P. 156°/0.05 mm. Hg; hydrochloride, M.P. 163–164°.

1-dimethylaminopropyl-4-phenyl - 4 - isopropyl-2-pyrrolidone, B.P. 224°/10 mm. Hg.

1-dimethylaminoethyl - 4 - phenyl-4-methyl-2-pyrrolidone, B.P. 149°/0.05 mm. Hg; hydrochloride, M.P. 203°.

1-diethylaminoethyl - 4 - phenyl-4-isopropyl-2-pyrrolidone, B.P. 185°/0.07 mm. Hg.

1-diethylaminoethyl - 4 - phenyl-4-n-propyl-2-pyrrolidone, B.P. 227°/11 mm. Hg.

1 - dimethylaminoethyl-4-phenyl-4-isopropyl - 2 - pyrrolidone, B.P. 170°/0.02 mm. Hg; hydrochloride, M.P. 177°; bromomethylate, M.P. 194°.

1 - piperidylpropyl-4-phenyl-4-ethyl-2-pyrrolidone, B.P. 170°/0.005 mm. Hg; hydrochloride, M.P. 160°.

1-dimethylaminoethyl-4-phenyl-4-n-propyl - 2 - pyrrolidone, B.P. 170°/0.05 mm. Hg; hydrochloride, M.P. 167°.

1-dimethylaminoethyl - 4 - phenyl-4-n-butyl-2-pyrrolidone, B.P. 215°/12 mm. Hg; hydrochloride, M.P. 174°.

1-piperidylpropyl-3-methyl - 4 - phenyl-4-isopropyl-2-pyrrolidone, B.P. 198°/0.002 mm. Hg.

The starting material, 3-methyl-4-phenyl - 4 - isopropyl-2-pyrrolidone, M.P. 116–117°, required to produce 1-piperidylpropyl-3-methyl-4-phenyl-4-isopropyl - 2 - pyrrolidone, may be produced by forming a sodium salt in ether from isopropylphenyl acetonitrile and sodium amide, treating the sodium salt thus obtained with α- bromopropionic acid ethyl ester and hydrogenating the resulting α-methyl-β-cyano-β-isopropyl-β-phenylpropionic acid ethyl ester in the presence of Raney cobalt.

Example 2

According to the procedure described in Example 1, a suspension of the sodium salt of 4-phenyl-4-isopropyl-2-pyrrolidone was prepared from 100 g. of 4-phenyl-4-isopropyl-2-pyrrolidone and 29 g. of sodium methylate. The suspension was added to a solution of 300 g. of 1,4-dibromobutane in benzene and heated under reflux until neutral. The precipitated sodium bromide was filtered under suction. The diethylcarbonate, benzene and unused 1,4-dibromobutane were separated by distillation. The residual viscous oil was taken up in benzene and heated under reflux with 150 g. of piperidine for 4 hours, then extracted with 3 N hydrochloric acid and finally treated with ammonia. There was obtained again a viscous oil which was taken up in benzene and then distilled. The 1 - piperidylbutyl-4-phenyl-4-isopropyl-2-pyrrolidone thus obtained boiled at 275–280°/12 mm. Hg. The hydrochloride was produced as described in Example 1 to obtain water soluble crystals melting at 151°.

By the same procedure there was obtained from the sodium salt of 4-phenyl-4-isopropyl-2-pyrrolidone, trimethylenechlorobromide and piperidine, 1-piperidylpropyl-4-phenyl-4-isopropyl-2-pyrrolidone, B.P. 193–195°/0.2 mm. Hg.

Example 3

30 g. of 4-phenyl-4-n-propyl-2-pyrrolidone, 18 g. of paraformaldehyde and 40 ml. of diethylamine were heated under reflux for 2 hours in 400 ml. of ethanol. The reaction mixture was then concentrated in vacuo at a bath temperature of 70°. The residue was taken up in 200 ml. of 30% acetic acid and filtered. Ammonia was added to the filtrate to precipitate 1-diethylaminomethyl-4-phenyl-4-n-propyl-2-pyrrolidone. The latter was converted to the hydrochloride by adding ethanolic HCl. The crystalline hydrochloride was slightly soluble in water and melted at 116°.

By following the procedure described in the preceding paragraph, the following additional compounds were produced:

1-piperidylmethyl-4-phenyl-4-n-propyl - 2 - pyrrolidone hydrochloride, M.P. 169° (from 4-phenyl-4-n-propyl-2-pyrrolidone, formaldehyde and piperidine).

1-piperidylmethyl - 4 - phenyl-2-pyrrolidone hydrochloride, M.P. 195–196° (from 4-phenyl-2-pyrrolidone).

1-piperidylmethyl-4-phenyl - 4 - isopropyl - 2 - pyrrolidone, M.P. 82° (from 4-phenyl-4-isopropyl-2-pyrrolidone).

We claim:

1. A compound selected from the group consisting of bases having the formula

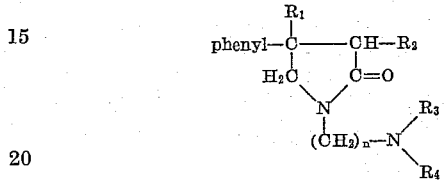

wherein n represents a whole number from 1 to 6, $R_1$ and $R_2$ represent a member of the group consisting of hydrogen and lower alkyl and $R_3$ and $R_4$ represent a member of the group consisting of hydrogen, lower alkyl and, jointly with the nitrogen atom, piperidyl, morpholinyl and pyrrolidyl, and medicinally acceptable acid addition salts thereof.

2. 1-piperidylpropyl-4-phenyl - 4 - isopropyl-2-pyrrolidone.

3. 1-piperidylpropyl - 4 - phenyl-4-isopropyl-2-pyrrolidone hydrochloride.

4. 1-dimethylaminoethyl - 4 - phenyl-4-n-propyl-2-pyrrolidone.

5. 1-dimethylaminoethyl - 4 - phenyl-4-n-propyl-2-pyrrolidone hydrochloride.

References Cited in the file of this patent
UNITED STATES PATENTS

| | | |
|---|---|---|
| 2,555,353 | Lucas et al. | June 5, 1951 |
| 2,555,354 | Lucas et al. | June 5, 1951 |